(12) United States Patent
Hosokawa

(10) Patent No.: US 11,588,736 B2
(45) Date of Patent: Feb. 21, 2023

(54) COMMUNICATION APPARATUS, COMMUNICATION METHOD, AND PROGRAM

(71) Applicant: NEC Corporation, Tokyo (JP)

(72) Inventor: Mamoru Hosokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 139 days.

(21) Appl. No.: 17/253,249

(22) PCT Filed: Jun. 20, 2019

(86) PCT No.: PCT/JP2019/024439
§ 371 (c)(1),
(2) Date: Dec. 17, 2020

(87) PCT Pub. No.: WO2019/244966
PCT Pub. Date: Dec. 26, 2019

(65) Prior Publication Data
US 2021/0266261 A1    Aug. 26, 2021

(30) Foreign Application Priority Data

Jun. 22, 2018  (JP) .............................. JP2018-118852

(51) Int. Cl.
*H04L 47/12* (2022.01)
*H04L 47/283* (2022.01)
*H04L 67/56* (2022.01)

(52) U.S. Cl.
CPC ............ *H04L 47/12* (2013.01); *H04L 47/283* (2013.01); *H04L 67/56* (2022.05)

(58) Field of Classification Search
None
See application file for complete search history.

(56) References Cited

U.S. PATENT DOCUMENTS

| 9,231,829 | B2 | 1/2016 | Isobe | |
|---|---|---|---|---|
| 9,515,939 | B2 | 12/2016 | Kodama | |
| 2012/0290727 | A1* | 11/2012 | Tivig | .................... H04L 69/163 709/227 |
| 2013/0148507 | A1* | 6/2013 | Wen | ...................... H04W 40/22 370/237 |
| 2014/0355442 | A1 | 12/2014 | Isobe | |

(Continued)

FOREIGN PATENT DOCUMENTS

| JP | 2005-348107 A | 12/2005 |
|---|---|---|
| JP | 2007-005894 A | 1/2007 |

(Continued)

OTHER PUBLICATIONS

International Search Report and Written Opinion corresponding to PCT/JP2019/024439 dated Aug. 13, 2019 (11 total pages).

(Continued)

*Primary Examiner* — Rebecca E Song

(57) ABSTRACT

A communication apparatus comprises a TCP terminating part that terminates TCP communication with an apparatus of data transmission destination, a monitoring part that monitors network status of the apparatus of data transmission destination on a per-session basis, and a transferring rate controlling part that changes size of a transmission buffer that is adopted to the session based on the network status.

15 Claims, 14 Drawing Sheets

(56) References Cited

U.S. PATENT DOCUMENTS

| | | | |
|---|---|---|---|
| 2015/0131440 A1* | 5/2015 | Kodama | ............... H04L 47/225 |
| | | | 370/231 |
| 2019/0104077 A1* | 4/2019 | Burgess | ................. H04L 69/04 |
| 2020/0267083 A1 | 8/2020 | Osuga | |

FOREIGN PATENT DOCUMENTS

| | | |
|---|---|---|
| JP | 2015-095780 A | 5/2015 |
| JP | 2016-136701 A | 7/2016 |
| WO | WO-2013-125096 A1 | 8/2013 |
| WO | WO-2017-119408 A1 | 7/2017 |

OTHER PUBLICATIONS

Kawazoe et al., "Design and evaluation of network-adaptive streaming library for screen transfer system," IEICE Technical Report, 2012, vol. 112, No. 208, pp. 25-30.

* cited by examiner

FIG. 6

| SESSION ID | RTT | THROUGHPUT | ACK DENSITY | PACKET LOSS | TRANSMISSION BUFFER |
|---|---|---|---|---|---|
| A | XXX | XXX | XXX | XXX | XXX |
| B | YYY | YYY | YYY | YYY | YYY |
| .. | .. | .. | .. | .. | .. |

COMMUNICATION APPARATUS, COMMUNICATION METHOD, AND PROGRAM

FIELD

The present invention relates to a communication apparatus, a communication method, and a program.

BACKGROUND

Cross-Reference to Related Application

This patent application is a national stage application of International Application No. PCT/JP2019/024439 entitled "COMMUNICATION APPARATUS, COMMUNICATION METHOD, AND PROGRAM," filed on Jun. 20, 2019, which claims the benefit of priority of Japanese Patent Application No. 2018-118852, filed on Jun. 22, 2018, the disclosures of each of which are hereby incorporated by reference in their entirety.

In the Transmission Control Protocol (TCP), a packet loss-based scheme, a delay-based scheme, and a hybrid scheme that combines these schemes are known as congestion control algorithms. The packet loss-based scheme observes packet loss and suppresses an amount of transmission by assuming that congestion has occurred when there is an increase in packet loss, in which there are CUBIC algorithm and so on. In addition, the delay-based scheme observes packet delays and reduces an amount of transmission by judging that congestion has occurred when the delay amount increases, in which there are Westwood+, and so on.

In the patent literature 1 (PTL 1), a communication apparatus is disclosed, wherein free capacity of the transmission buffer is constantly monitored and the window size notified by the receiving apparatus is changed based on the free capacity of the transmission buffer, which allows to prevent a decrease in throughput.

Further, the patent literature 2 (PTL 2) discloses a terminal that can change a buffer size for transmission and a buffer size for receiving to an appropriate size for TCP communication according to communication speed.

[PTL 1]
Japanese Patent Kokai Publication No. JP2015-95780A
[PTL 2]
Japanese Patent Kokai Publication No. JP2016-136701A

SUMMARY

The following analysis has been made by the present invention. Since the packet loss-based scheme described above is based on the slow-start scheme, packet loss and retransmission are repeated, when traffic flow exceeds theoretical maximum throughput of network. As a result, not only the communication but also the quality of experience (QoE) of user will be deteriorated.

FIG. 13 illustrates a change in throughput caused by TCP control in the so-called narrow-band communication where the maximum throughput on the transmission line is relatively small in relation to the incoming traffic. As shown in FIG. 13, after a slow start, when traffic flow exceeds the maximum throughput on the transmission line, packet loss occurs, window size is reduced and the lost packets are retransmitted. On the other hand, if the same amount of traffic continues to flow in thereafter, cumulative packet loss amount will increase, as shown in the shaded area at the bottom of FIG. 13. As a result, TAT (Turn Around Time) will increase and user's experience QoE will be deteriorated. In addition, the network state may not always be constant and may change from moment to moment, and efficiency of the network resource use will decrease by the amount of the delay when a quick care is not taken.

It is a main purpose of the present invention to provide a communication apparatus, a communication method, and a program that can contribute to stably reduce packet loss regardless of network status and improvement of network utilization efficiency.

Solution to Problem

According to a first aspect of the present invention, there is provided a communication apparatus, comprising: a TCP terminating part that terminates TCP (Transmission Control Protocol) communication with an apparatus of data transmission destination; and a monitoring part that monitors network status of the apparatus of data transmission destination on a per-session basis. Further, this apparatus comprises a transferring rate controlling part that changes size of a transmission buffer that is adopted to the session based on the network status.

According to a second aspect of the present invention, there is provided a method of communication, comprising: a TCP terminating part that terminates TCP communication with an apparatus of data transmission destination; the method comprising: monitoring network status of the apparatus of data transmission destination on a per-session basis; and changing size of a transmission buffer that is adopted to the session based on the network status.

According to a third aspect of the present invention, there is provided A program, executed by a computer that performs communicating operations, installed in a communication apparatus comprising: a TCP terminating part that terminates TCP communication with an apparatus of data transmission destination; causing a computer to perform processings of: monitoring network status of the apparatus of data transmission destination on a per-session basis; and changing size of a transmission buffer that is adopted to the session based on the network status.

This program can be stored in a computer-readable (non-transient) storage medium. That is, the present invention can be implemented as a computer program product.

According to the present invention, it is possible to reduce packet loss and improve network utilization efficiency regardless of network status. That is, the present invention transforms a communication apparatus using TCP, as shown in the background, to a communication apparatus that dramatically improves in light of the reduction of packet loss and network utilization efficiency.

BRIEF DESCRIPTION OF THE DRAWINGS

FIG. 6 illustrates a diagram to explain an example of session information held by the Proxy server according to the first exemplary embodiment.

PREFERRED MODES

First, an outline of an exemplary embodiment will be described. In the following outline, various components are attached with reference signs for the sake of convenience. Namely, the following reference signs are merely used as examples to facilitate understanding of the outline. Thus, the disclosure is not limited to the description of the following outline. In addition, connecting lines between blocks in each figure include both bidirectional and unidirectional. One-way arrow schematically shows a flow of a main signal (data) and does not exclude bidirectionality. The program is executed via a computer device, wherein the computer device comprises, for example, a processor, a storage device, an input device, a communication interface, and, if necessary, a display device. The computer apparatus is configured to communicate with a device, whether wired or wireless, in the apparatus or with an external device (including a computer) via a communication interface. There are ports or interfaces at the connection points of input and output of each block in a figure, but the figure is omitted. In the following description, "A and/or B" is used in the sense of at least one of A and B.

Figure 1:
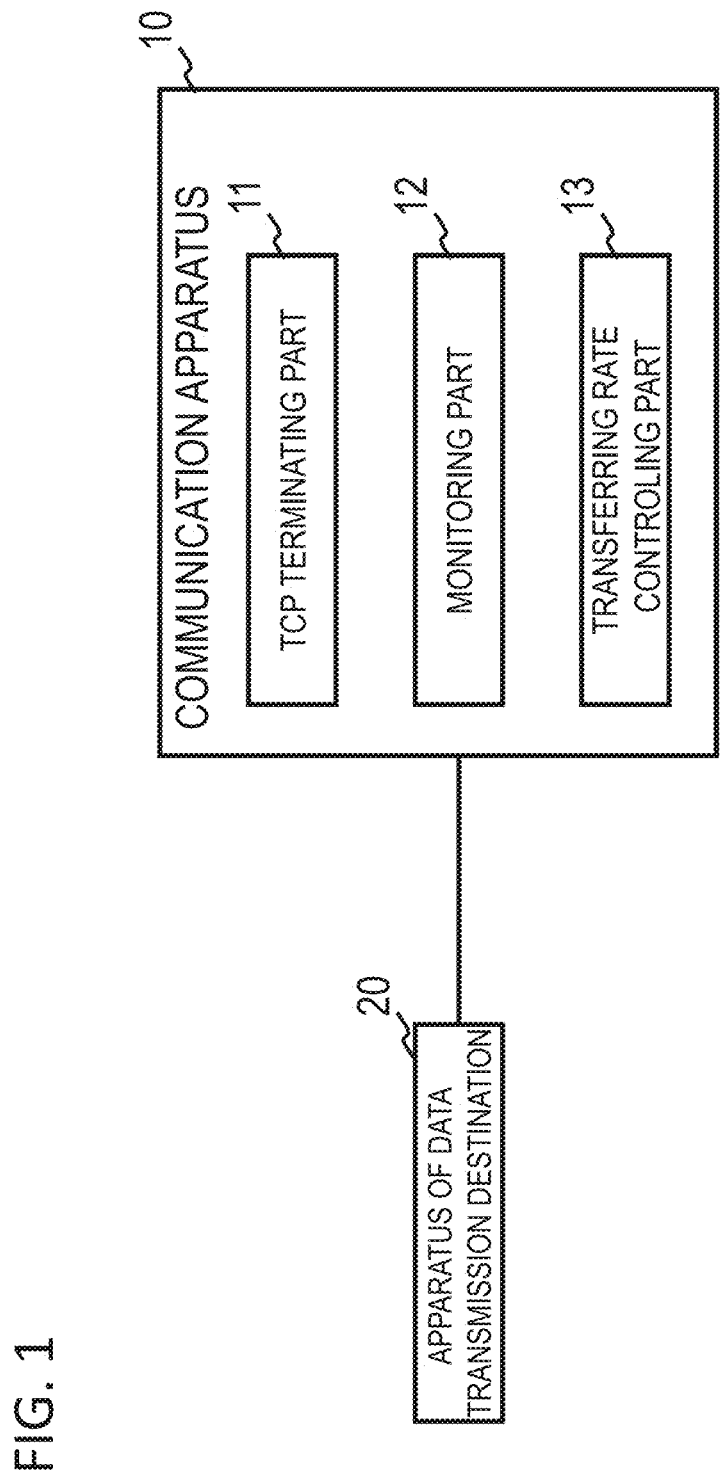
FIG. 1 illustrates a schematic diagram to explain a configuration of an exemplary embodiment.

The present invention, as illustrated in FIG. 1, according to an exemplary embodiment can be implemented by a communication apparatus 10 comprising a TCP terminating part 11, a monitoring part 12, and a transferring rate controlling part 13. A typical example of such a communication apparatus 10 is a contents server.

More concretely, the TCP terminating part 11 terminates TCP communication with an apparatus of data transmission destination 20. The monitoring part monitors network (line) status of the apparatus of data transmission destination 20. Indicators of this network (line) status include throughput and round-trip time (RTT).

And the transferring rate controlling part 13 changes size of a transmission buffer that is adopted to a session based on the network status. For example, when the state of the network is determined to be worse, the transferring rate controlling part 13 performs a control to reduce the size of the transmission buffer regardless of the increase in packet loss or whether or not a notification of the window size is received from a receiving apparatus. This makes it possible to reduce the transmission rate before the packet loss increases and to reduce the occurrence of packet loss.

On the contrary, when the state of the network is determined to be good, the transferring rate controlling part 13 performs a control to increase the size of the transmission buffer regardless of the increase in packet loss or whether or not a notification of the window size is received from the receiving apparatus. This enables effective utilization of the network resources that are in good condition.

Figure 2:
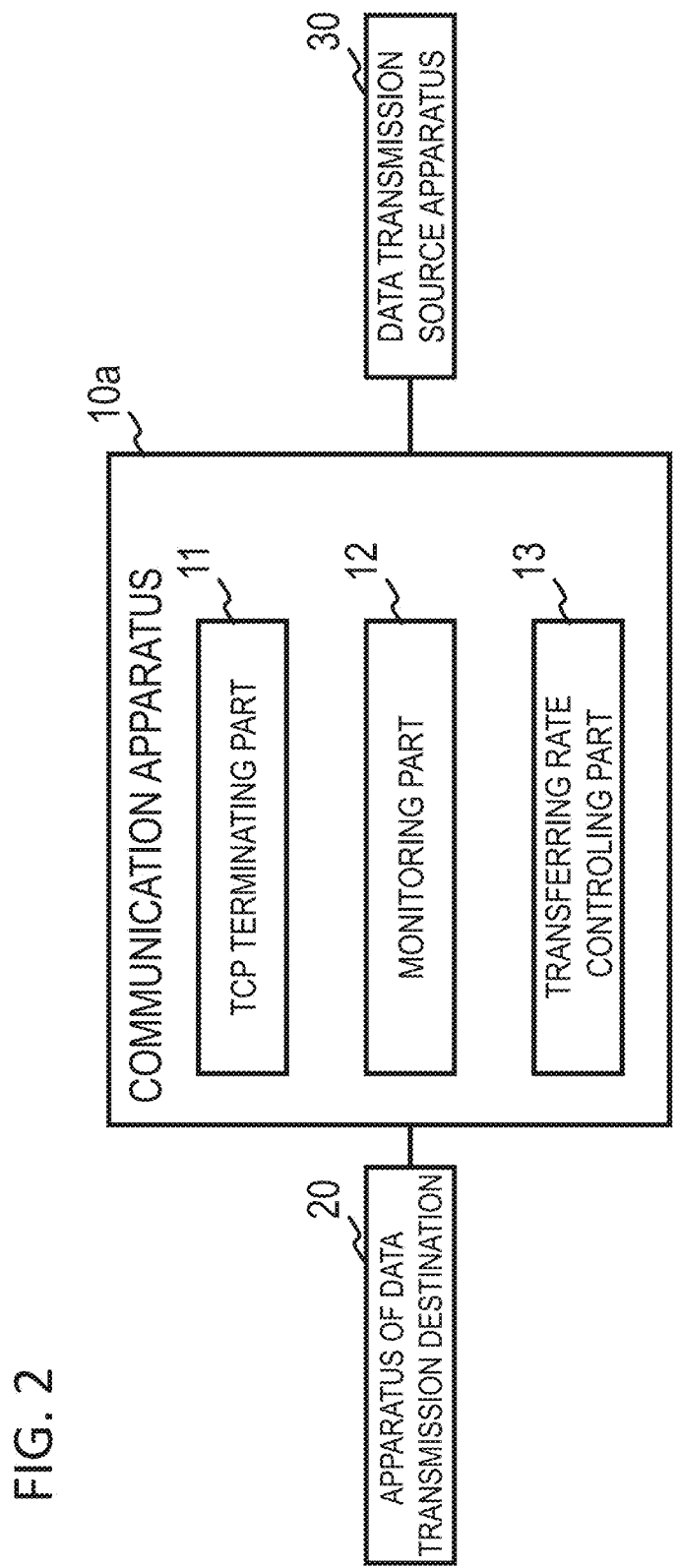
FIG. 2 illustrates a schematic diagram to explain a varied configuration of an exemplary embodiment.

The communication apparatus employable in the present invention is not limited to the communication apparatus 10 in a mode shown in FIG. 1. For example, as shown in FIG. 2, the present invention can also be applied to the communication apparatus 10a, which functions as a relay apparatus that relays data from a data transmission source apparatus 30 to an apparatus of data transmission destination 20, as shown in FIG. 2. The communication apparatus 10a in this case similarly controls transfer rate dynamically according to the state of the network, and thus reduces an occurrence of packet loss and makes effective use of the network resources.

First Exemplary Embodiment

Figure 3:
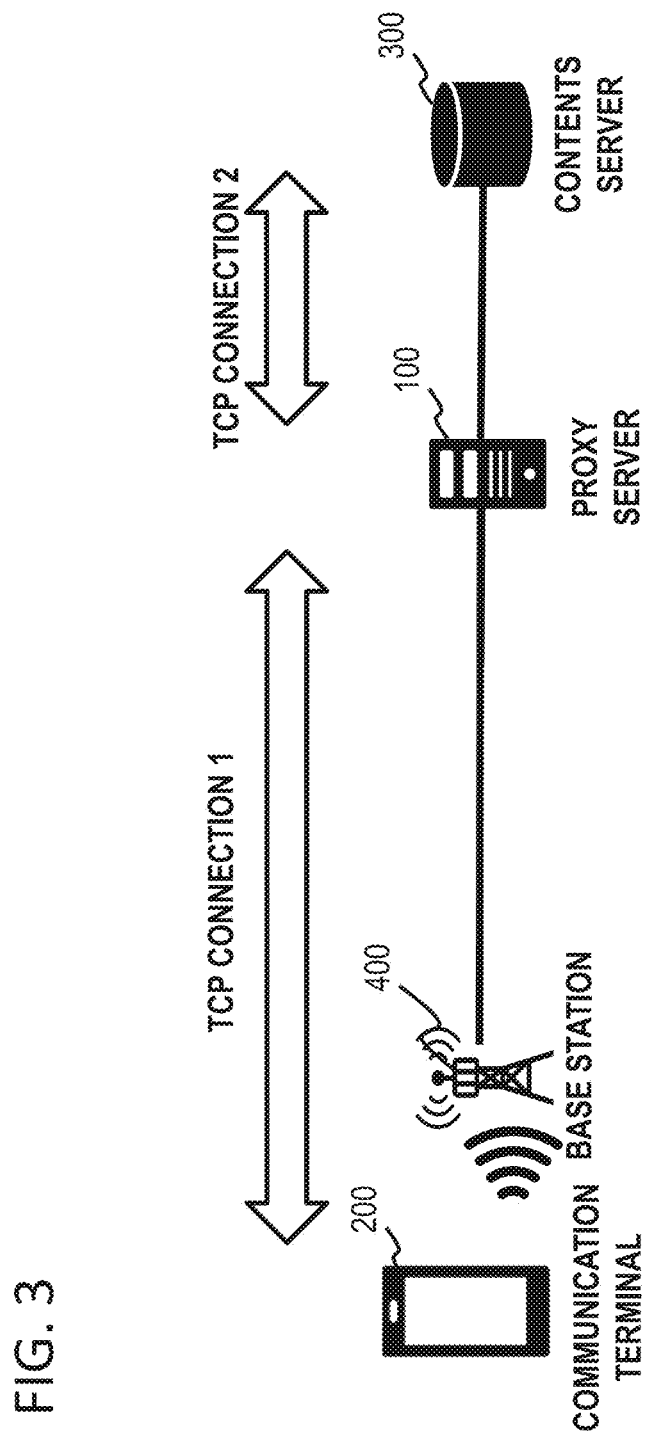
FIG. 3 illustrates a schematic diagram to explain a configuration of a first exemplary embodiment.

Next, the first exemplary embodiment of the present invention applied to a Proxy server that is deployed in a mobile communication network and relays data will be described in detail with reference to the drawings. FIG. 3 illustrates a configuration of the first exemplary embodiment of the present invention. Referring to FIG. 3, a configuration in which a Proxy server 100 is deployed between a communication terminal 200 and a contents server 300 is shown. Although omitted in FIG. 3, an apparatus(es) such as BorderGateWay (BGW), Serving Gateway (S-GW), and PDN Gateway (P-GW) may be deployed between the proxy server 100 and a base station 400.

The communication terminal 200 accesses the contents server 300 via a base station 400 and receives transmission of a content(s). In this exemplary embodiment, the communication terminal 200 is a data transmission destination apparatus. The communication terminal 200 may be a smartphone or the like, as well as an in-vehicle terminal or a device that redistributes the content received from the contents server 300.

The contents server 300 is a server that provides various types of contents, such as videos and music.

The proxy server 100 is deployed between the communication terminal 200 and the contents server 300 and terminates TCP connections 1 and 2 between the communication terminal 200 and the contents server 300. The Proxy server 100 is configured to reduce packet loss and retransmissions for each of the above mentioned TCP connections by appropriately setting a window size and other configuration values, respectively. The Proxy server 100 in this exemplary embodiment will be described as ones optimizing TCP connection 1, including a wireless section of FIG. 3.

The proxy server 100 measures throughput, RTT (Round-Trip Time), packet loss status, and ACK (Acknowledgement) density (described below) at a predetermined time interval for each session of TCP connection 1. Then, based on the measurement results, size of a transmission buffer(s) of data for the communication terminal 200 is adjusted.

In this exemplary embodiment, it is also explained assuming that the proxy server 100 has resources capable of providing resources for accepting the entire traffic and that resource exhaustion of the Proxy server itself would not occur. In a more preferable mode, if a shortage of resources of the proxy server 100 is predicted, it is desirable to distribute the resources to multiple proxy servers by a load balancer or to reroute to other route(s).

Figure 4:
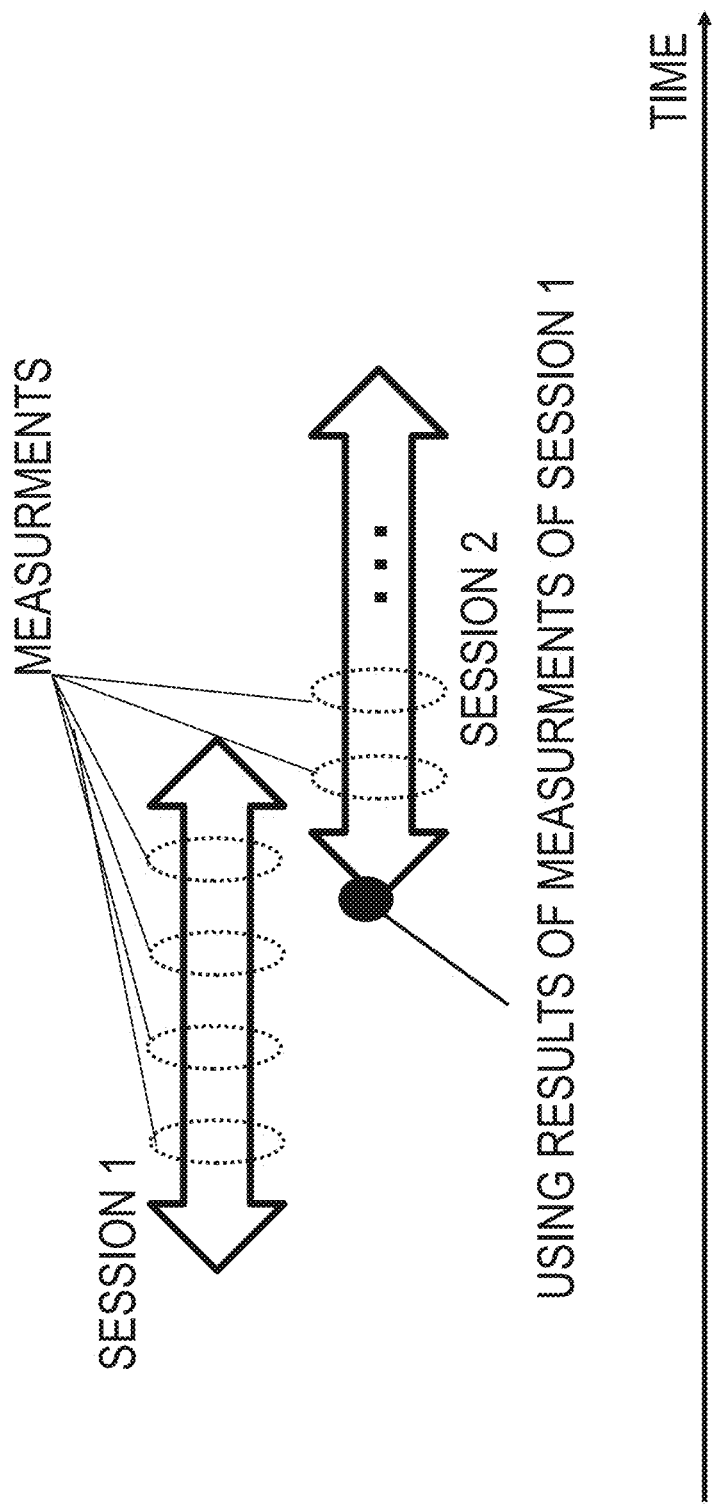
FIG. 4 illustrates a diagram to explain an outline of operation of Proxy server according to the first exemplary embodiment.

FIG. 4 illustrates an outline of the operation of the Proxy server 100 in this exemplary embodiment. FIG. 4 shows two sessions 1 and 2 started on TCP connection 1. The dashed ovals on sessions 1 and 2 indicate measurement timings. As illustrated in FIG. 4, at a predetermined time interval after the start of the session, the Proxy server 100 starts the measurement and determines the size of the transmission buffer of the data for the communication terminal 200 based on the results of the measurement. Further, the Proxy server 100 of this exemplary embodiment determines the size of the transmission buffer using the measurement results of session 1 at the start of session 2. This allows Session 2 to communicate at a desired speed from the beginning of communication.

Figure 5:
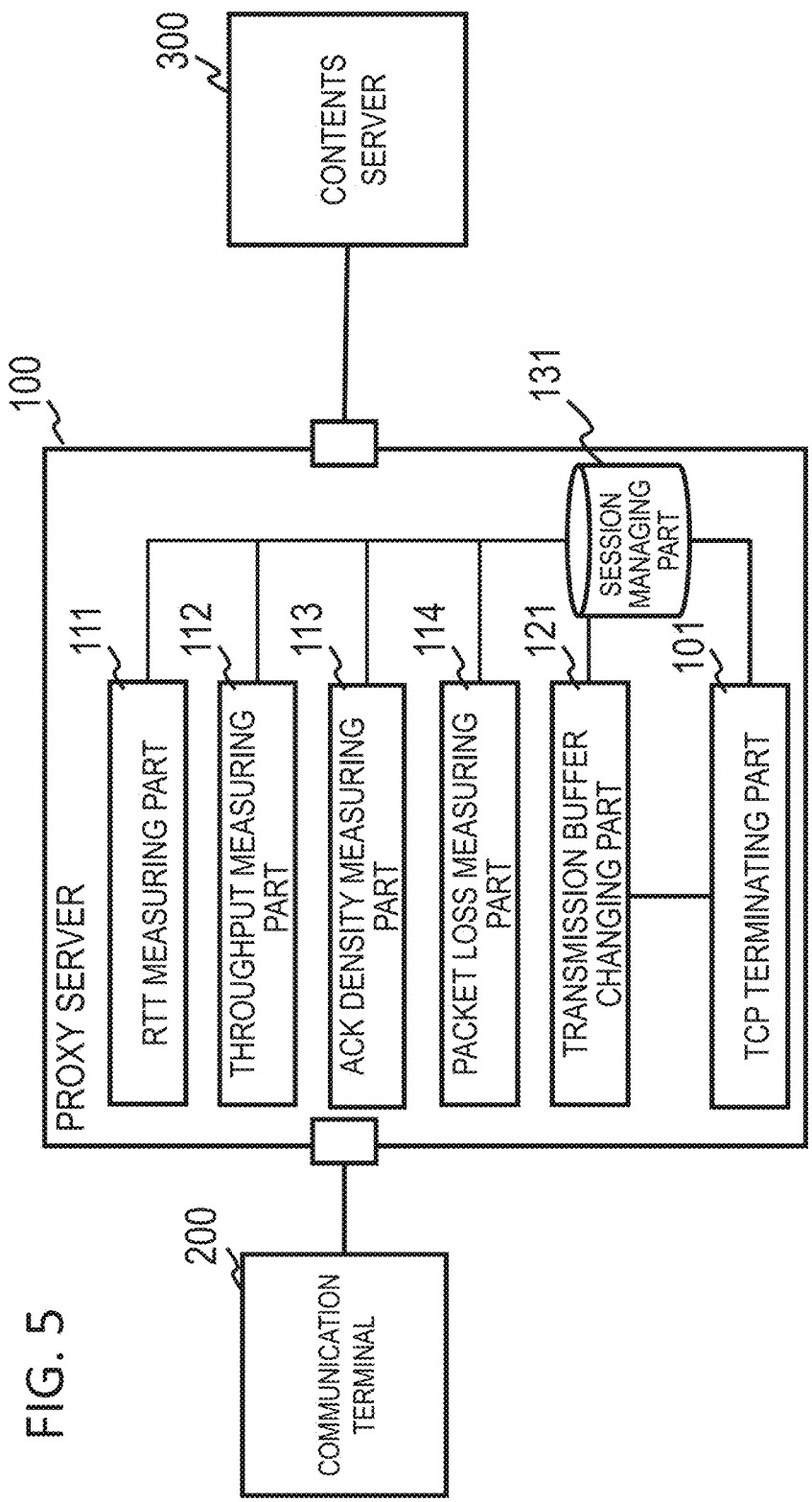
FIG. 5 illustrates a diagram to explain a configuration of the Proxy server according to the first exemplary embodiment.

Next, a configuration of the Proxy server 100 to realize the above functions will be described in detail with reference to the drawings. Referring to FIG. 5, a configuration comprising RTT measuring part 111, throughput measuring part 112, ACK density measuring part 113, packet loss measuring part 114, transmission buffer changing part 121, TCP terminating part 101, and session managing part 131 is shown.

The RTT measuring part 111 measures RTT based on time of an ACK packet sent by the communication terminal 200 in response to a packet sent to the communication terminal 200.

The throughput measuring part 112 measures throughput per session. The throughput can be calculated by transmission data size/unit time, or it can also be calculated using the window size and the RTT described above. In this case, the throughput (bps) can be calculated by window size*8/RTT.

The ACK density measuring part 113 measures an index termed ACK density, which is an average value of ACK reception packets per unit time. When calculating the throughput based on the above transmission data size/unit time, the transmission data size is usually in Mbit (megabit) units and the unit time is a millisecond or less. If the unit time is shortened for the purpose of sensing the changes in the network more precisely, the unit time will approximate to zero, which may result in a very large throughput calculation error. This ACK density measures the density, which is the amount of change in the ACK packets, not the size of the transmitted data, so the measurement error will be small. Therefore, measuring the ACK density in conjunction with the above RTT and the throughput will make it possible to improve reliability of the measurement results.

The packet loss measuring part 114 measures an amount of packet loss per unit of time. The RTT measuring part 111, the throughput measuring part 112, the ACK density measuring part 113, and the packet loss measuring part 114 as mentioned hereinabove correspond to the monitoring part 12 described above.

The session managing part 131 manages data per session measured by the RTT measuring part 111, throughput measuring part 112, ACK density measuring part 113, and packet loss measuring part 114 as mentioned hereinabove on a session-by-session basis.

FIG. 6 illustrates an example of session information managed by the session managing part 131. In the example in FIG. 6, the most recently measured RTT, throughput, ACK density, and packet loss for each session and the size of the transmission buffer currently being applied can be managed.

The transmission buffer changing part 121 determines whether or not the size of the transmission buffer needs to be changed based on each measured data stored in the session managing part 131. If, as a result of the above described determination, it is determined that the size of the transmission buffer needs to be changed, the TCP terminating part 101 is instructed to change the size of the transmission buffer. Accordingly, the transmission buffer changing part 121 corresponds to the transfer rate controlling part 13 described above. The transmission buffer changing part 121 also updates the value of the transmission buffer held in the session managing part 131 to the size of the transmission buffer as instructed above.

Whether or not to change the size of the transmission buffer can be determined by, for example, whether or not there has been a significant change in each measurement data stored in the session managing part 131. An increase or decrease in the size of the transmission buffer can be determined as follows. For example, if network condition is worse than a previous determination time point, the size of the transmission buffer can be reduced by a predetermined amount. Also, for example, if the network condition is better than a previous determination time point, the size of the transmission buffer can be increased by a predetermined value. By increasing or decreasing the size of the transmission buffer in this way, it is possible to transmit at a rate according to the network status, and consequently, it is possible to reduce packet loss and improve network utilization efficiency. The network status may be calculated by a score calculated by giving weights to the above RTT, throughput, ACK density, and amount of packet loss, etc. as mentioned above respectively, for example.

Whether or not to change the size of the transmission buffer by the transmission buffer changing part 121 can also be determined based on following criteria. For example, a plurality of appropriate transmission buffer sizes for each category of measured data, such as RTT, throughput, ACK density, and packet loss, are set according to the measured values. The transmission buffer changing part 121 then determines the transmission buffer size by referring to these settings. Alternatively in a more desirable mode, the transmission buffer changing part 121 can select a transmission buffer size that is the smallest transmission buffer size among the transmission buffer sizes determined from these measurement data.

Of course, the range of increase or decrease in the size of the transmission buffer can be changed according to the degree of change in the status of the network. For example, if the condition of the network is extremely worse than a previous determination time point, the decreasing range of the size of the transmission buffer can be set to larger than a normal value. Also, for example, if the network condition is extremely better than a previous determination time point, the increase in the size of the send buffer can be larger than the normal. Of course, the range of change in the size of the transmission buffer may be changed incrementally by comparing the score indicating the network status with two or more threshold values.

The TCP terminating part 101 terminates TCP connection 2 between the contents server 300 and the Proxy server 100 and the TCP connection 1 between the communication terminal 200 and the Proxy server 100, respectively. The TCP terminating part 101 also transmits data for the session on the TCP connection 1 between the communication terminal 200 and the Proxy server 100 by applying the size of the transmission buffer determined by the transmission buffer changing part 121 above. Naturally, the window size to be notified to the communication terminal 200 is also determined based on a free capacity of this transmission buffer.

Also, at a start of a new session, the TCP terminating part 101 determines initial value of the transmission buffer size by referring to measurement information of the existing session stored in the session managing part 131. This makes it possible to obtain an appropriate throughput from the beginning of a communication.

Figure 7:
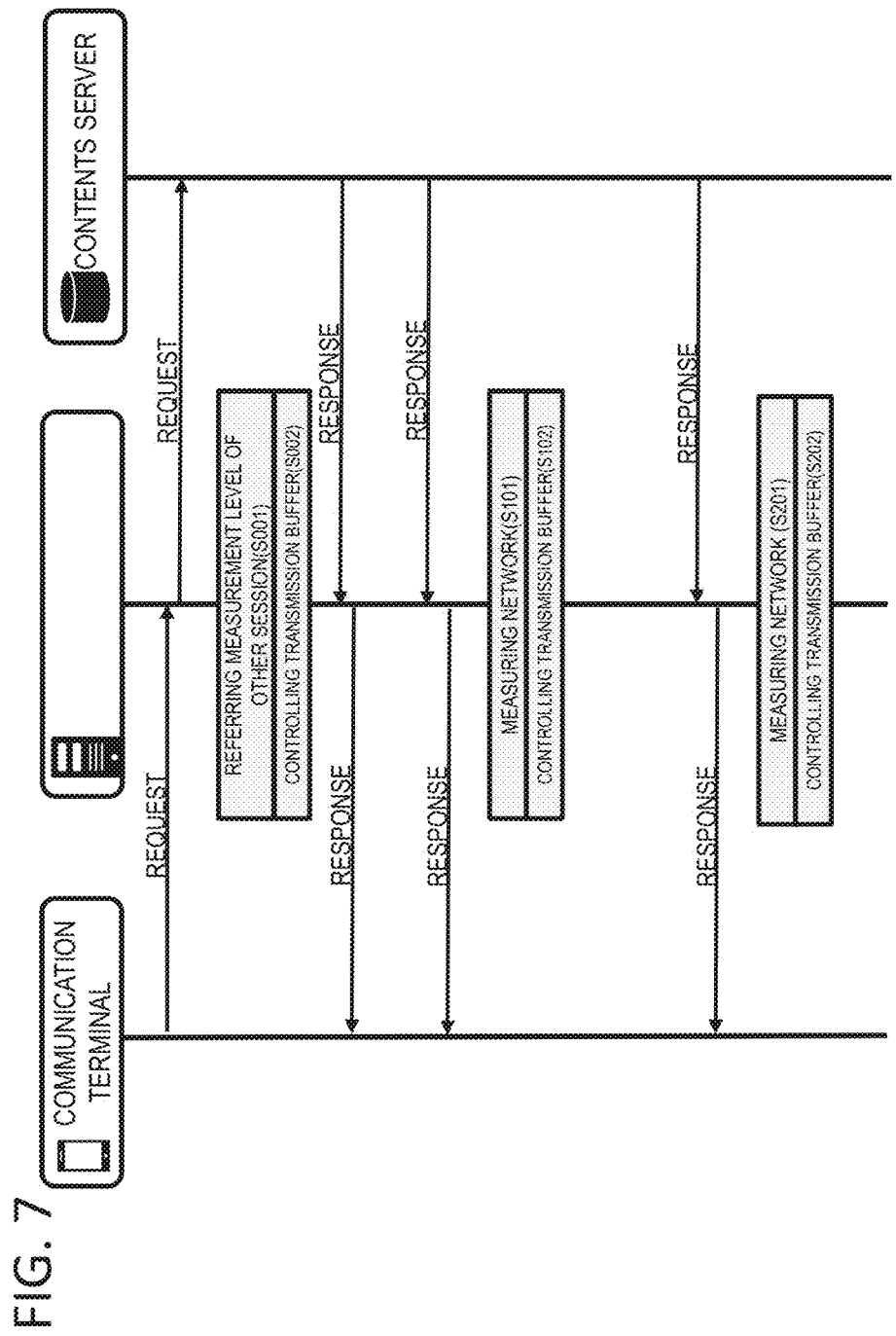
FIG. 7 illustrates a sequence diagram to represent an operation according to the first exemplary embodiment.

Next, an operation of this exemplary embodiment will be described in detail with reference to the drawings. FIG. 7 is a sequence diagram illustrating the operation of the first exemplary embodiment of the present invention. Referring to FIG. 7, first, the Proxy server 100, which receives a request for transmission of content (request) from the communication terminal 200, establishes a TCP connection with the communication terminal 200.

Next, the Proxy server 100 establishes a TCP connection with the contents server 300 and transmits a request for transmission of content (request) from the communication terminal 200.

Next, the Proxy server 100 determines initial value of transmission buffer size (S001) by referring to measurement information of an existing session (S002). Here, for example, if there is an existing session between the Proxy server 100 and the communication terminal 200, the measurement values measured on the existing session can be used to determine the initial value of the transmission buffer size.

When the contents server 300, which has received the above request, sends an ACK to the content transmission request (request), followed by transmission of content (response), the Proxy server 100 transfers them to the communication terminal 200. As a result, playback of the content or the like is started at the communication terminal 200.

Thereafter, the Proxy server 100 repeats measurement of the status of the network (steps S101 and S201, "NW measurement") and modification of the transmission buffer size (steps S102 and S202, "transmission buffer control") at predetermined time intervals.

Based on the above, the transmission buffer size is optimized by the Proxy server 100 according to the network conditions until the session ends.

Figure 8:
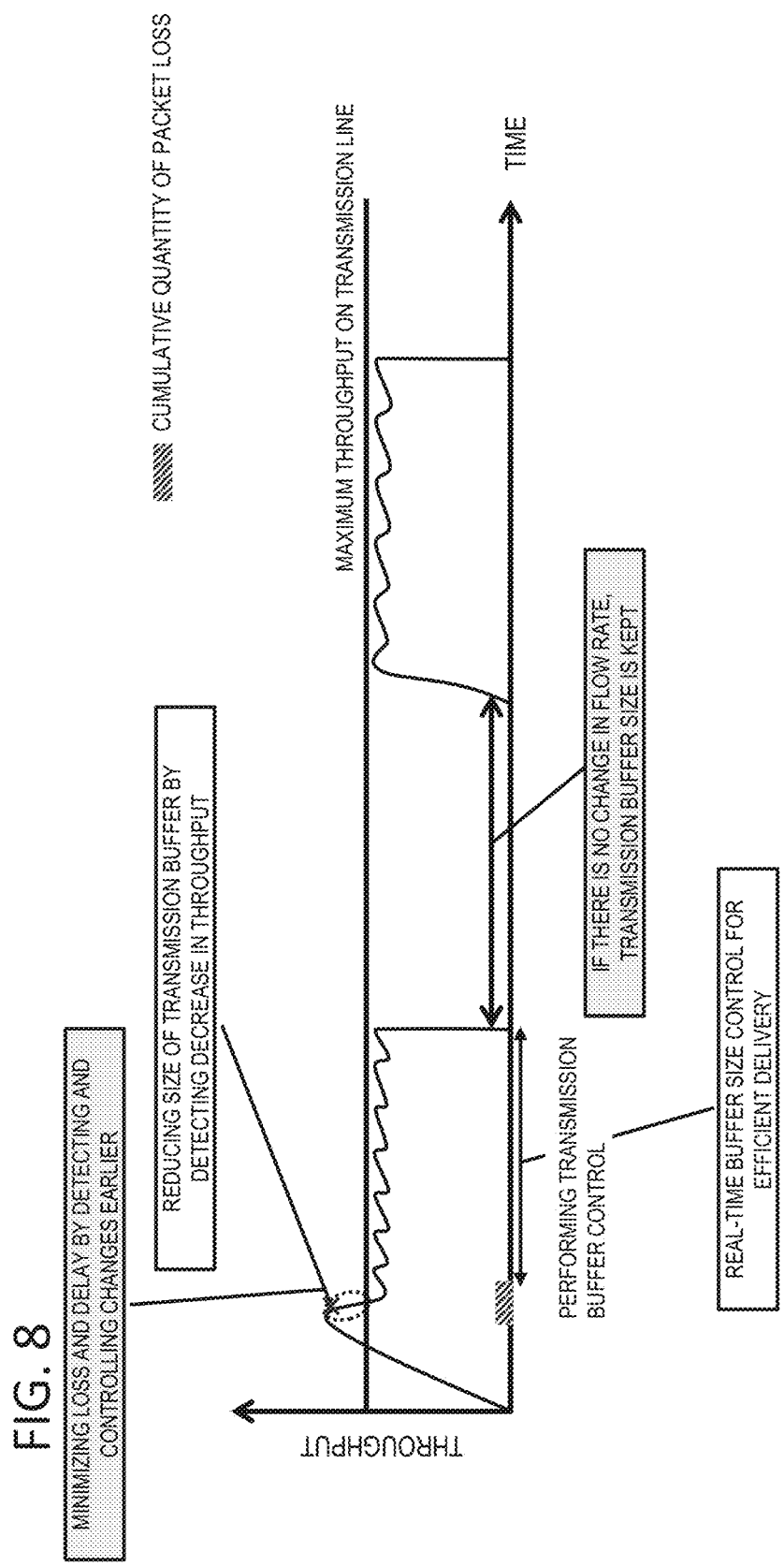
FIG. 8 illustrates a diagram to explain effects according to the first exemplary embodiment.

Next, an effect of the present embodiment will be described using drawings. FIG. 8 illustrates the effect of the first exemplary embodiment of the present invention. As shown in FIG. 8, packet loss is measured when a slow start is performed in the absence of an existing session and a traffic flows in exceeding the throughput of the transmission line. In addition, a reduction in the size of the transmission buffer is implemented because packet loss reduces RTT and throughput. Thereafter, the state of the network is measured at predetermined intervals, and the size of the transmission buffer is controlled based on the results of this measurement (see "Transmission buffer control implementation" at the bottom of FIG. 8). As a result, occurrence of packet loss is suppressed.

After that, even if data transmission stops, the Proxy server 100 of this exemplary embodiment keeps the size of the transmission buffer because it is still measuring the state of the network. Therefore, as shown on the right side of FIG. 8, when data transmission is resumed, it is possible to promptly produce a throughput close to the maximum throughput on the transmission line. The period of time to keep the size of the transmission buffer may be a certain fixed period of time, and then the size may be restored to a predetermined initial value. By doing so, the resources of the Proxy server 100 can be effectively utilized.

Figure 9:
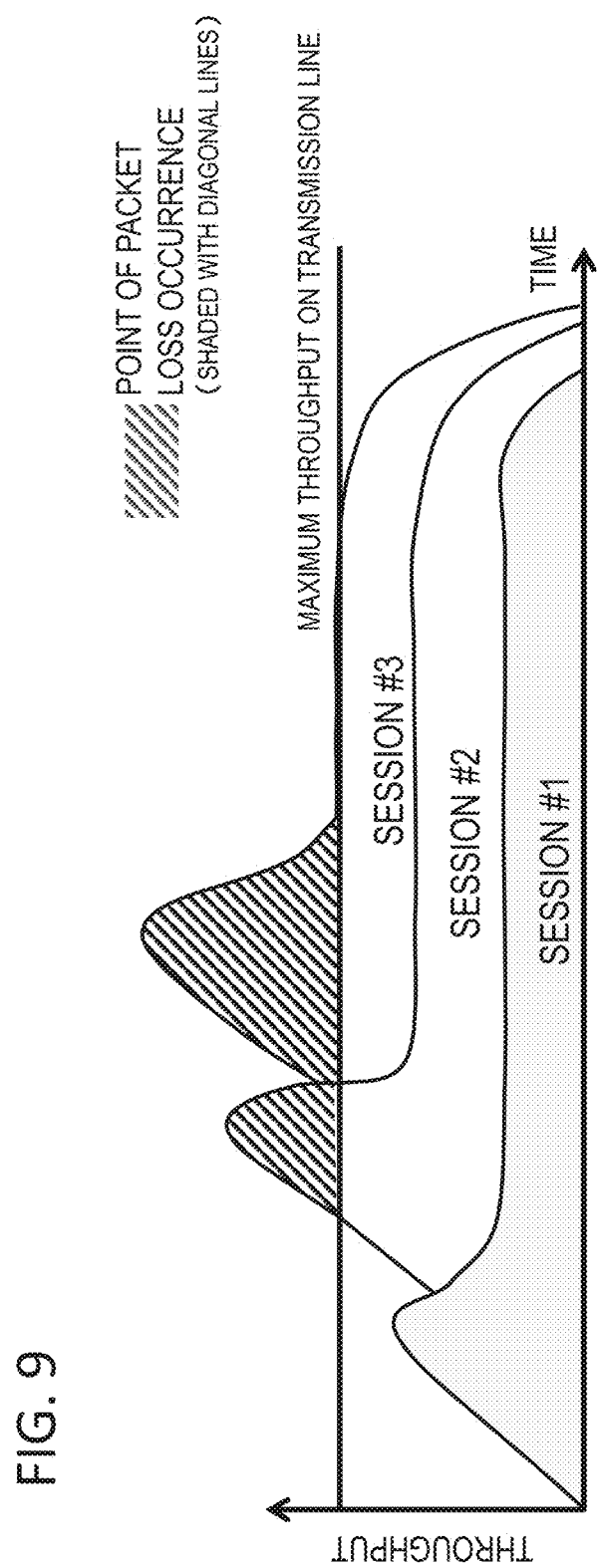
FIG. 9 illustrates a diagram to explain an amount of cumulative packet loss for multiple session connections with a comparable scheme.

In addition, this exemplary embodiment is more effective when multiple sessions occur. FIG. 9 illustrates the locations where packet loss occurs when three sessions are started sequentially in a comparative case where the size of the transmission buffer is not controlled. As shown in FIG. 9, even when there is a sufficient bandwidth (communication line capacity) for one session, when there are two or more sessions, the packets that flow in exceeding the maximum throughput on the transmission line will be lost.

Figure 10:
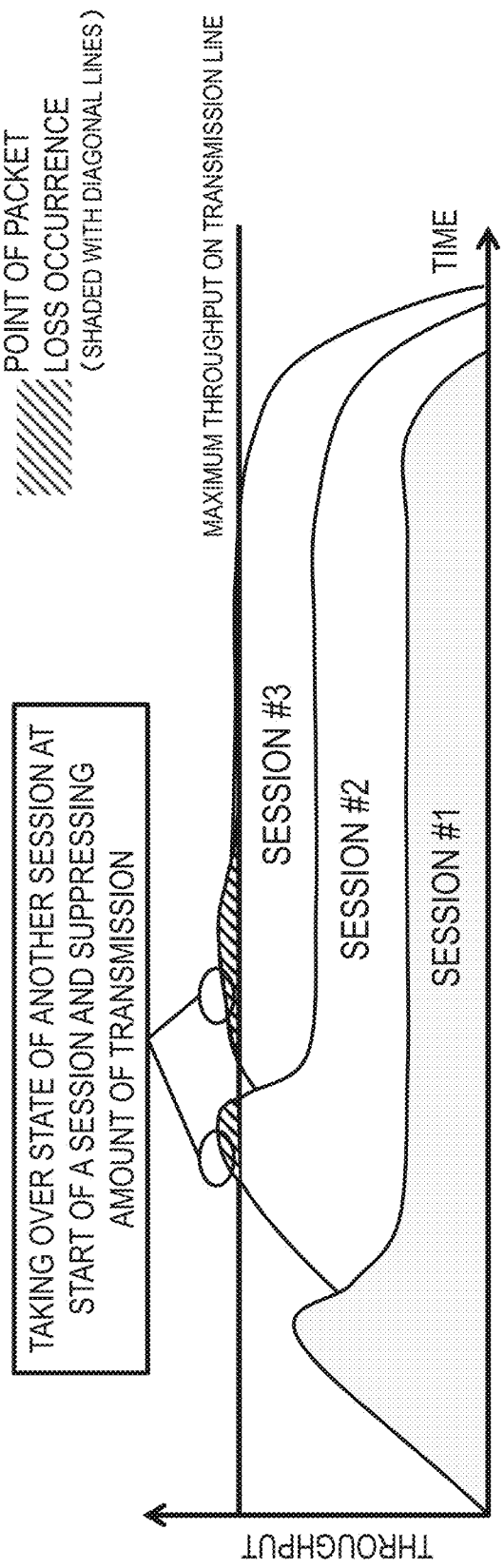
FIG. 10 illustrates a diagram to explain an effect of multiple session connections according to the first exemplary embodiment.

FIG. 10 illustrates locations of packet loss when three sequential sessions are started and when the transmission buffer size control of this exemplary embodiment is implemented. As shown in FIG. 10, after the start of session #2, packets that flow in exceeding the maximum throughput on the transmission path are lost, but the subsequent loss of packets in session #2 is suppressed because the transmission buffer size reduction control is immediately implemented. At the start of session #3, the measured data from session #2 is used to determine an initial size of the transmission buffer. Therefore, even if a large value be set as the initial congestion window, the communication can be carried out at a suppressed transmission rate from the start of the session.

Figure 11:
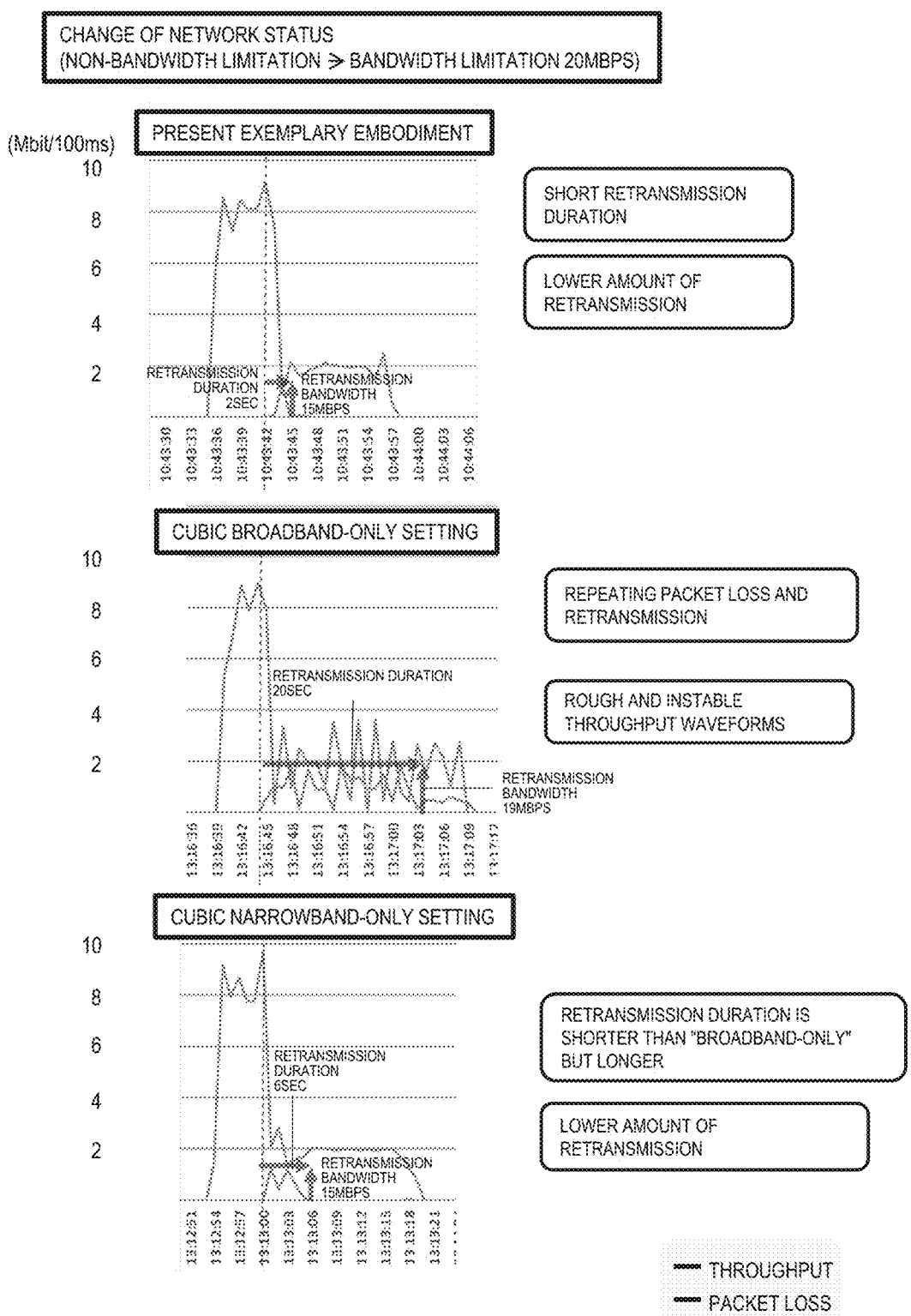
FIG. 11 illustrates a diagram to explain difference in effects when network condition is changed.

Furthermore, this exemplary embodiment is flexible enough to respond to fluctuations in network conditions. FIG. 11 illustrates the measured changes in throughput when the bandwidth is changed from non-bandwidth limit to bandwidth limit of 20 Mbps. The dashed lines in FIG. 11 represent timings of the bandwidth change. The top graph illustrates changes in throughput when using this exemplary embodiment. The middle graph illustrates changes in throughput when operating with the CUBIC algorithm and broadband-only setting. The bottom graph illustrates changes in throughput with the CUBIC algorithm and the narrowband-only setting.

In the middle graph of the CUBIC broadband-only setting, waveform is rough and throughput is instable, resulting in larger values retransmission duration and retransmission bandwidth (retransmission bandwidth peak value). On the other hand, in this exemplary embodiment, the retransmission duration and the retransmission bandwidth have been successfully reduced, respectively. The reason for this resides in that the size of transmission buffer is dynamically tracked based on measurement results of the network. The retransmission duration and retransmission bandwidth (retransmission bandwidth peak value) are smaller in the CUBIC narrowband-only setting at a lower graph than in the CUBIC broadband-only setting, but they are not comparable to the present exemplary embodiment.

Figure 12:
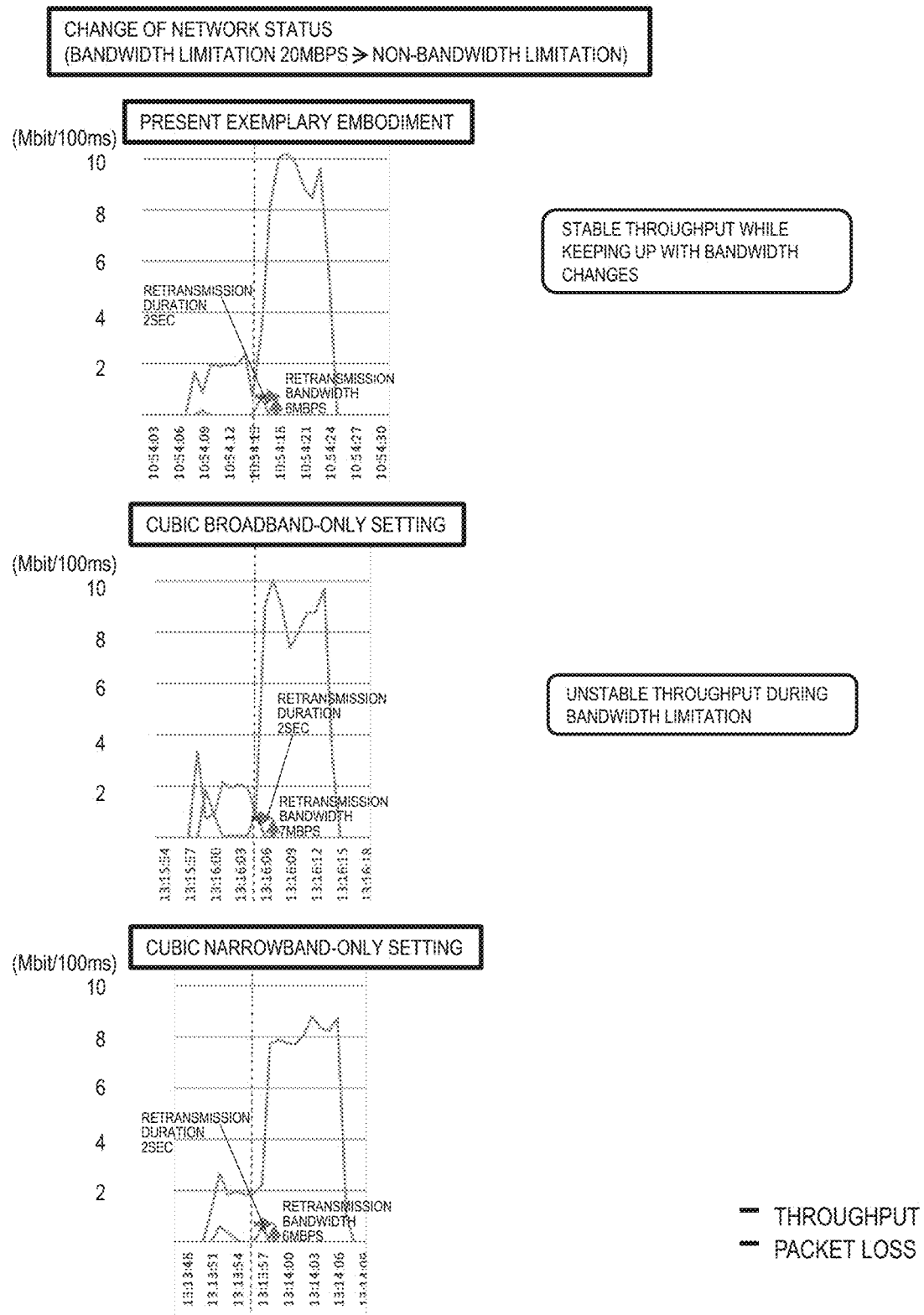
FIG. 12 illustrates another diagram to explain difference in effects when network condition is changed.
Figure 13:
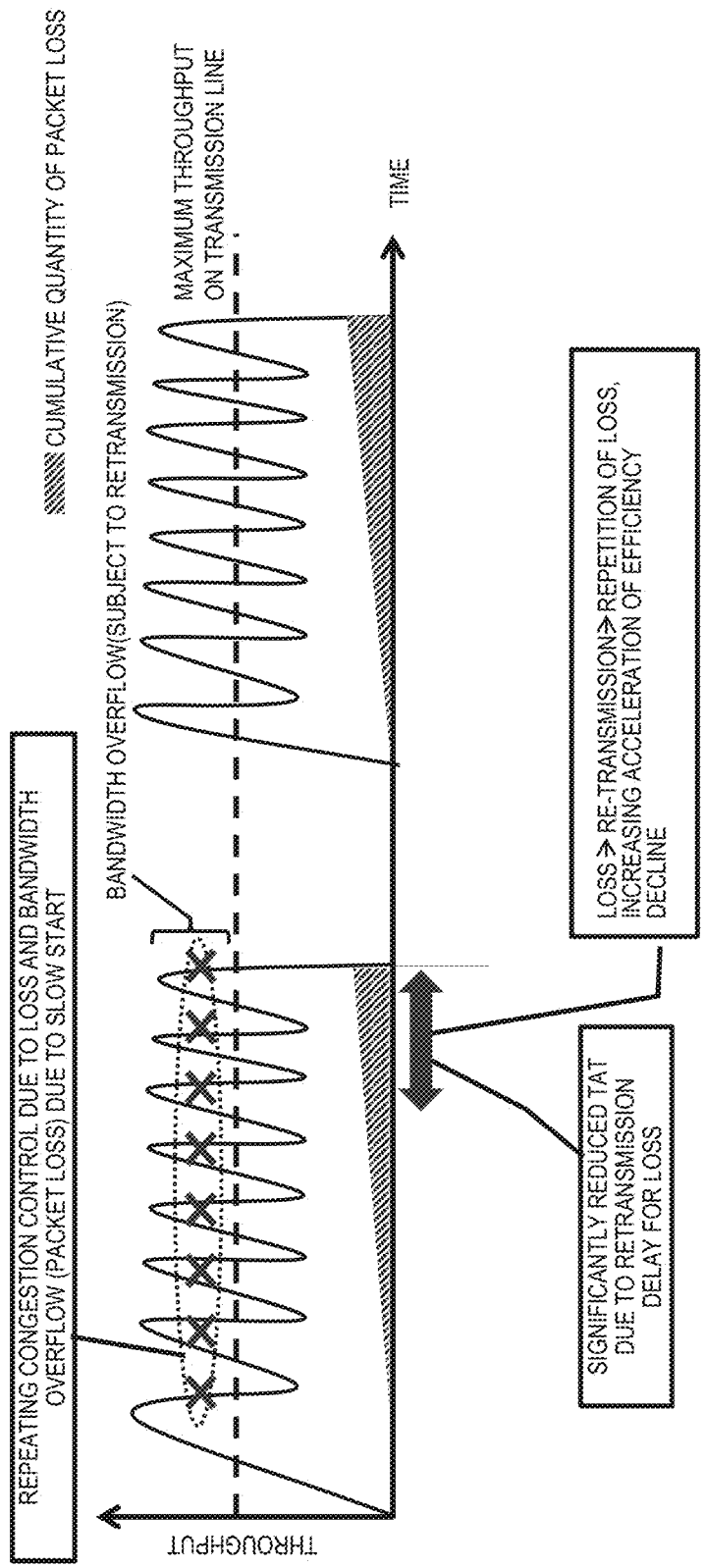
FIG. 13 illustrates a diagram to represent changes in throughput under TCP control in narrowband communication.

FIG. 12 illustrates measured changes in throughput when the bandwidth limitation is changed from 20 Mbps set to non-bandwidth limitation. The dashed lines in FIG. 12 indicate timings of the change in bandwidth. The top graph in FIG. 12 illustrates the change in throughput when using the present exemplary embodiment. The middle and bottom graphs illustrate the changes in throughput when the CUBIC algorithm is operated in broadband-only and narrowband-only settings, respectively.

In the CUBIC wideband-only setting at the middle graph, a waveform in the section where the bandwidth limitation is set is rough and the throughput is instable, resulting in packet loss. On the other hand, in the present exemplary embodiment, the throughput is stable before and after the bandwidth change and the throughput rises faster after the bandwidth limitation is removed in comparison to the CUBIC narrowband-only setting.

The above effects of the present exemplary embodiment can be summarized as follows.

(1) In this exemplary embodiment, an appropriate transmission buffer size can be set for a new session based on measured network status (see FIG. 9 and FIG. 10).

(2) In this exemplary embodiment, the transmission buffer size is adjusted according to network condition, so that the packet loss is reduced and throughput is stabilized (see FIG. 8, FIG. 11 and FIG. 12).

(3) The effects of (1) and (2) above are achieved in multi-session connections.

In the above, exemplary embodiments of the invention have been explained, but the present invention is not limited to the above-described exemplary embodiments, and further variations, substitutions, and adjustments can be made to the invention to the extent that they do not depart from the basic technical concept of the invention. For example, a network configuration, a configuration of each element, and a form of expression of messages shown in the drawings are examples to help understanding of the invention and are not limited to the configurations illustrated in these drawings.

For example, in the exemplary embodiment described above, RTT, throughput, ACK density, and packet loss are measured, but these are just examples of measurement items for understanding the network status. Any of the RTT, throughput, ACK density, and packet loss items can be omitted or replaced with other items. Also, the measurement intervals of these items can be set appropriately depending on the load on the Proxy server 100 and the network, the measurement accuracy, and other factors. The measurement intervals of these items need not be the same, and the measurement intervals may be changed for each item.

Although the above-described exemplary embodiment is described as having the Proxy server 100 control the transmission buffer size, the same control may be performed by the contents server 300.

In the above-described exemplary embodiment, the downstream data from the proxy server 100 to the communication terminal 200 is explained as being subject to control, but the upstream data from the communication terminal 200 to the contents server 300 may also be subject to control by the proxy server 100. In this case, the proxy server 100 will optimize the TCP connection 2 illustrated in FIG. 3.

Figure 14:
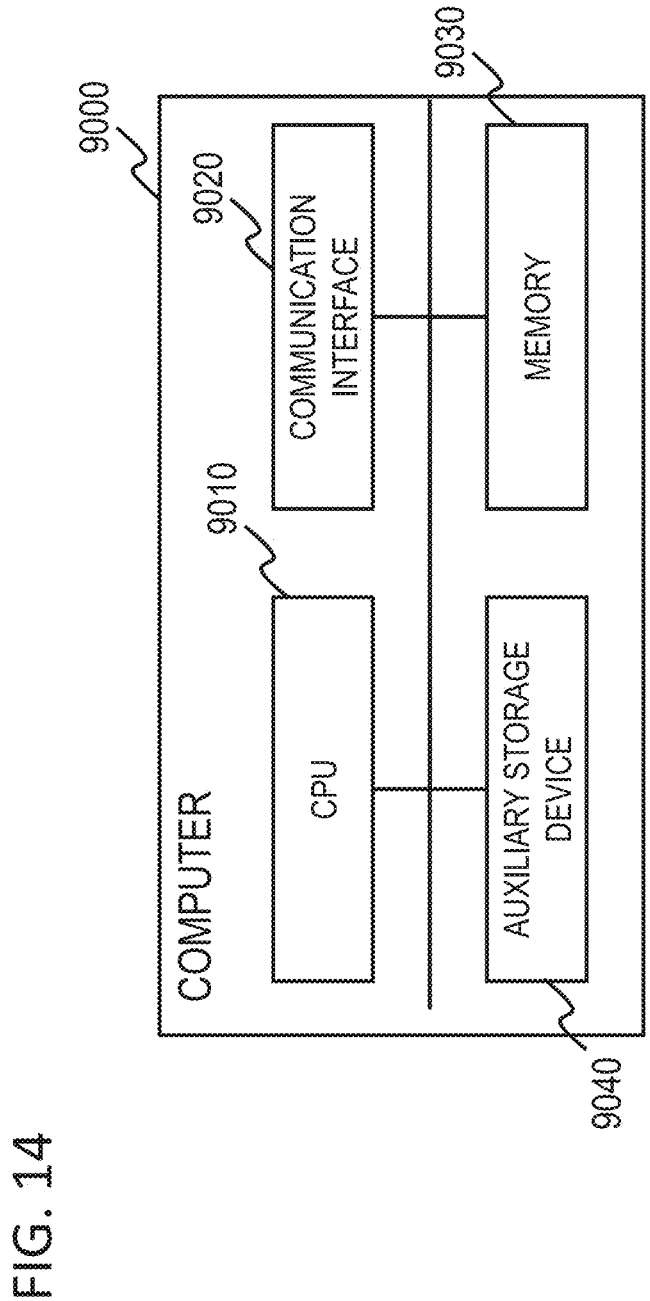
FIG. 14 illustrates a diagram to show a configuration of a computer that configures the Proxy server according to the present invention.

The procedure shown in the above exemplary embodiments can be implemented by a program that causes a computer (9000 in FIG. 14) to perform the function as a Proxy server 100. Such a computer is exemplified in the configuration of FIG. 14 with a CPU (Central Processing Unit) 9010, a communication interface 9020, a memory 9030, and an auxiliary storage device 9040. That is, the CPU 9010 of FIG. 14 can execute a program for monitoring the network status and a program for changing the transmission buffer size, and can be caused to perform an update process of each calculation parameter stored in the auxiliary storage device 9040 and the like.

That is, each part (processing means, function) of the Proxy server 100 shown in the above-described exemplary embodiment can be realized by a computer program that causes the processor installed in the Proxy server 100 to perform each of the above-described processes using the hardware thereof.

Finally, preferred modes of the present invention are summarized.

[Mode 1]
(See the first aspect of communication apparatus above.)

[Mode 2]
The monitoring part of the above described communication apparatus can be configured to monitor at least one or more of the throughput of the relevant session, the round-trip time (RTT), and the rate of occurrence of packet loss, as the state of the network as described above.

[Mode 3]
The monitoring part of the above described communication device may also monitor the number of ACK reception packets per unit of time as a state of the network.

[Mode 4]
The above described communication apparatus may be configured to determine an initial size of a transmission buffer by referring to measured data indicating the network state of the same TCP connection.

[Mode 5]
The above described communication apparatus can be configured to function as a proxy server that is deployed between a contents server and a communication terminal that requests the contents server to send data via a base station and terminates the TCP connection to the communication terminal.

[Mode 6]
(See the second aspect of communication Method above.)

[Mode 7]
(See the third aspect of program above.)

The 6th to 7th modes above can be developed into the 2nd to 5th modes as well as the 1st mode.

The disclosure of the above PTLs are incorporated herein by reference thereto. Variations and adjustments of the exemplary embodiment and examples are possible within the scope of the disclosure (including the claims) of the present invention and based on the basic technical concept of the present invention. Various combinations and selections (including partial deletions) of various disclosed elements (including the elements in the claims, exemplary embodiment, examples, drawings, etc.) are possible within the scope of the disclosure of the present invention. Namely, the present invention of course includes various variations and modifications that could be of course made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been concretely disclosed.

SIGNS LIST 10, 10a communication apparatus
11 TCP terminating part
12 monitoring part
13 transferring rate controlling part
20 apparatus of data transmission destination
30 data transmission source apparatus
100 Proxy server
101 TCP terminating part
111 RTT measuring part
112 throughput measuring part
113 ACK density measuring part
114 packet loss measuring part
121 transmission buffer changing part
131 session managing part
200 communication terminal
300 contents server
400 base station
9000 computer 9010 CPU
9020 communication interface
9030 memory
9040 auxiliary storage device

What is claimed is:

1. A communication apparatus, comprising:
at least a processor; and
a memory in circuit communication with the processor,
wherein the processor is configured to execute program instructions stored in the memory to:
terminate TCP (Transmission Control Protocol) communication with an apparatus of data transmission destination;
monitor network status of the apparatus of data transmission destination at a predetermined time interval for each session of TCP connection; and
when the network status changes more than the predetermined time interval, determine changing a size of a transmission buffer and change the size of the transmission buffer,
wherein monitoring the network status includes monitoring throughput, round-trip time (RTT), average value of ACK reception packets per unit time (ACK density), and occurrence rate of packet loss as the network status.

2. The communication apparatus according to claim 1; wherein terminating TCP communication includes deciding an initial value of the transmission buffer size for a new session by referring to measured data indicating the network status of same TCP connection managed on a session-by-session basis.

3. The communication apparatus according to claim 1; wherein the communication apparatus that performs a function of a proxy server that is deployed between a contents server and a communication terminal that requests data transmission via the contents server, and terminates TCP connection with the communication terminal.

4. The communication apparatus according to claim 1, wherein the network status is calculated by a score calculated by giving weights to the throughput, the RTT, the ACK density, and the occurrence rate of packet loss.

5. The communication apparatus according to claim 1,
wherein a plurality of appropriate transmission buffer sizes for each of measured data of the throughput, the RTT, the ACK density, and the occurrence rate of packet loss, are set according to the measured values, and
wherein the processor is further configured to execute program instructions stored in the memory to select a smallest transmission buffer size among the transmission buffer sizes determined from each of measured data of the throughput, the RTT, the ACK density, and the occurrence rate of packet loss.

6. A method of communication, comprising:
terminating TCP (Transmission Control Protocol) communication with an apparatus of data transmission destination;
monitoring network status of the apparatus of data transmission destination at a predetermined time interval for each session of TCP connection; and
when the network status changes more than the predetermined time interval, determining changing a size of a transmission buffer and changing the size of the transmission buffer,
wherein monitoring the network status includes monitoring throughput, round-trip time (RTT), average value of ACK reception packets per unit time (ACK density), and occurrence rate of packet loss as the network status.

7. The method of communication according to claim 6, further comprising:
deciding an initial value of the transmission buffer size for a new session by referring to measured data indicating the network status of same TCP connection managed on a session-by-session basis.

8. The method of communication according to claim 6, further comprising:
performing a function of a proxy server that is deployed between a contents server and a communication terminal that requests data transmission via the contents server, and terminating TCP connection with the communication terminal.

9. The method of communication according to claim 6, wherein the network status is calculated by a score calculated by giving weights to the throughput, the RTT, the ACK density, and the occurrence rate of packet loss.

10. The method of communication according to claim 6,
wherein a plurality of appropriate transmission buffer sizes for each of measured data of the throughput, the RTT, the ACK density, and the occurrence rate of packet loss, are set according to the measured values, and
the method further comprising selecting a smallest transmission buffer size among the transmission buffer sizes determined from each of measured data of the throughput, the RTT, the ACK density, and the occurrence rate packet loss.

11. A non-transitory computer readable recording medium, recording a program, executed by a computer that performs communicating operations, installed in a communication apparatus causing a computer to perform processings of:
terminating TCP (Transmission Control Protocol) communication with an apparatus of data transmission destination;
monitoring network status of the apparatus of data transmission destination at a predetermined time interval for each session of TCP connection; and
when the network status changes more than the predetermined time interval, determine changing a size of a transmission buffer and changing the size of the transmission buffer that is adopted to the session based on the network status,
wherein monitoring the network status includes monitoring throughput, round-trip time (RTT), average value of ACK reception packets per unit time (ACK density), and occurrence rate of packet loss as the network status.

12. The non-transitory computer readable recording medium according to claim 11, wherein the processings further comprise:
deciding an initial value of the transmission buffer size for a new session by referring to measured data indicating the network status of same TCP connection managed on a session-by-session basis.

13. The non-transitory computer readable recording medium according to claim 11, wherein the processings further comprise:
performing a function of a proxy server that is deployed between a contents server and a communication terminal that requests data transmission via the contents server, and terminates TCP connection with the communication terminal.

14. The non-transitory computer readable recording medium according to claim 11, wherein the network status is calculated by a score calculated by giving weights to the throughput, the RTT, the ACK density, and the occurrence rate of packet loss.

15. The non-transitory computer readable recording medium according to claim 11,
   wherein a plurality of appropriate transmission buffer sizes for each of measured data of the throughput, the RTT, the ACK density, and the occurrence rate of packet loss, are set according to the measured values, and
   the processings further comprises selecting a smallest transmission buffer size among the transmission buffer sizes determined from each of measured data of the throughput, the RTT, the ACK density, and the occurrence rate of packet loss.

* * * * *